United States Patent
Murray et al.

(10) Patent No.: US 10,286,816 B2
(45) Date of Patent: May 14, 2019

(54) VEHICLE LOADSPACE FLOOR

(71) Applicant: Ford Global Technologies, LLC, Dearborn, MI (US)

(72) Inventors: James Nicholas Murray, Chelmsford (GB); James Neugebauer, Chelmsford (GB); Richard Craven, Chelmsford (GB); Bruce Southey, Farnham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/727,862

(22) Filed: Oct. 9, 2017

(65) Prior Publication Data
US 2018/0099589 A1    Apr. 12, 2018

(30) Foreign Application Priority Data
Oct. 12, 2016    (GB) .................................. 1617313.0

(51) Int. Cl.
| | |
|---|---|
| *B60N 2/30* | (2006.01) |
| *B60N 2/32* | (2006.01) |
| *B60R 13/01* | (2006.01) |
| *B60N 2/015* | (2006.01) |
| *B60N 2/64* | (2006.01) |
| *B60R 11/00* | (2006.01) |
| *B60R 19/44* | (2006.01) |
| *B62D 25/20* | (2006.01) |
| *B60R 5/04* | (2006.01) |

(52) U.S. Cl.
CPC .............. *B60N 2/32* (2013.01); *B60N 2/015* (2013.01); *B60N 2/3095* (2013.01); *B60N 2/3097* (2013.01); *B60N 2/64* (2013.01); *B60R 5/04* (2013.01); *B60R 11/00* (2013.01); *B60R 19/44* (2013.01); *B62D 25/20* (2013.01); *B60N 2/3077* (2013.01); *B60R 13/01* (2013.01); *B60R 13/011* (2013.01); *B60R 13/013* (2013.01); *B60R 2011/0029* (2013.01)

(58) Field of Classification Search
CPC ..... B60R 13/01; B60R 13/011; B60R 13/013; B60R 2013/015; B60R 2013/016; B60N 2/30; B60N 2/3072; B60N 2/3075; B60N 2/3077; B60N 2/3079; B60N 2/3095; B60N 2/32; B60N 2/36; B60N 2002/363
USPC .............................. 296/64, 65.09, 69; 297/15
See application file for complete search history.

(56) References Cited

U.S. PATENT DOCUMENTS

| | | | | |
|---|---|---|---|---|
| 3,008,755 A | * | 11/1961 | Hale .................... | B60N 2/3013 296/37.2 |
| 3,151,906 A | * | 10/1964 | Roberts ................ | B60N 2/3011 296/66 |
| 3,902,752 A | | 9/1975 | Pelletier | |

(Continued)

FOREIGN PATENT DOCUMENTS

| | | |
|---|---|---|
| EP | 2957457 A1 | 12/2015 |
| GB | 2523822 A | 9/2015 |

(Continued)

*Primary Examiner* — Gregory A Blankenship
(74) *Attorney, Agent, or Firm* — Vichit Chea; Price Heneveld LLP

(57) ABSTRACT

A vehicle loadspace floor comprising a first deployable portion and a second deployable portion, the first and second deployable portions cooperating to form a rearward-facing seat extending through the opening of a loadspace of the vehicle when deployed from the loadspace floor.

18 Claims, 3 Drawing Sheets

(56) References Cited

U.S. PATENT DOCUMENTS

| | | | | |
|---|---|---|---|---|
| 6,000,751 | A * | 12/1999 | Kato | B60N 2/3011 296/65.16 |
| 6,663,156 | B1 * | 12/2003 | Kincaid | B60R 5/04 296/37.14 |
| 7,338,100 | B2 * | 3/2008 | Meyer | B60R 19/44 150/166 |
| 7,866,715 | B2 * | 1/2011 | Malina | B60R 19/44 293/117 |
| 8,052,194 | B2 * | 11/2011 | Sayama | B60N 2/01583 296/65.09 |
| 8,141,930 | B2 * | 3/2012 | Sayama | B60N 2/3011 296/65.09 |
| 8,215,671 | B2 * | 7/2012 | Bergstrom | B60R 21/231 280/729 |
| 8,287,037 | B2 * | 10/2012 | Sayama | B60N 2/01583 297/15 |
| 8,960,783 | B2 * | 2/2015 | Holder | B60N 2/3011 296/65.09 |
| 10,065,579 | B2 * | 9/2018 | Patrick | B60N 2/3075 |
| 2004/0026951 | A1 * | 2/2004 | Rudberg | B60N 2/10 296/65.09 |
| 2004/0164587 | A1 * | 8/2004 | Pickard | B60R 5/04 296/136.07 |
| 2007/0018475 | A1 | 1/2007 | McGinnis et al. | |
| 2007/0018975 | A1 | 1/2007 | Chuanggui et al. | |
| 2008/0035254 | A1 | 2/2008 | Brayshaw | |
| 2014/0333086 | A1 | 11/2014 | Zalan et al. | |
| 2016/0229317 | A1 * | 8/2016 | Janally | B60N 2/3095 |
| 2017/0021747 | A1 * | 1/2017 | Barnes | B60N 3/06 |
| 2017/0144614 | A1 * | 5/2017 | DePalma | B60R 13/013 |
| 2018/0099589 | A1 * | 4/2018 | Murray | B60N 2/015 |

FOREIGN PATENT DOCUMENTS

| | | | |
|---|---|---|---|
| JP | 63019449 U | 2/1988 | |
| JP | 2006-219017 | * 8/2006 | B60N 2/36 |
| JP | 2006219017 A | 8/2006 | |
| KR | 200432061 Y1 | 11/2006 | |
| KR | 101565706 B1 | 11/2015 | |

* cited by examiner

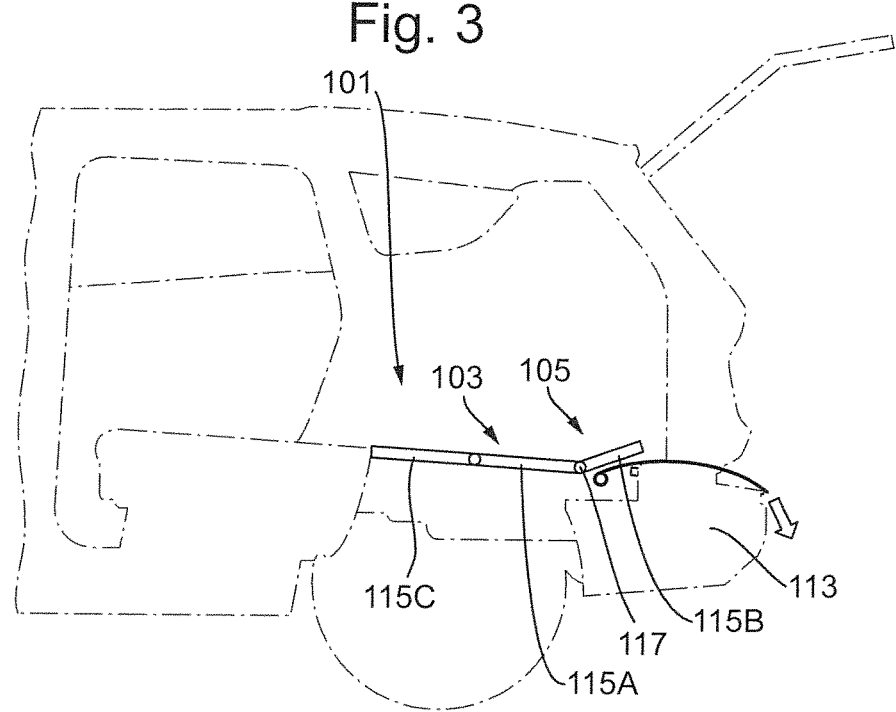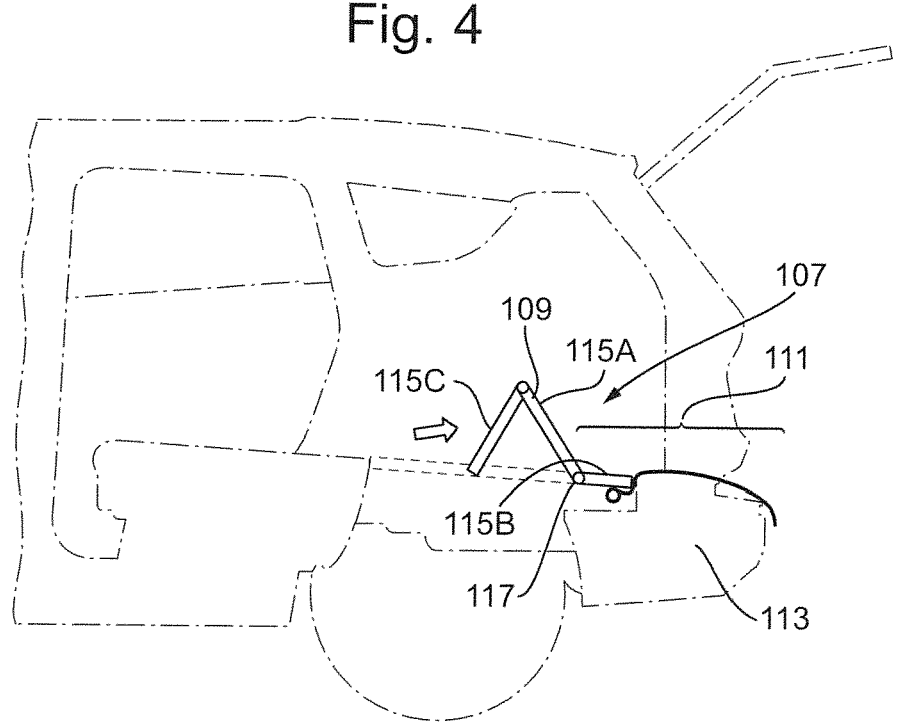

VEHICLE LOADSPACE FLOOR

FIELD OF THE INVENTION

The present invention generally relates to a vehicle loadspace floor, and more particularly relates to a vehicle loadspace floor that is reconfigurable to form a seat.

BACKGROUND OF THE INVENTION

When a vehicle is parked with its liftgate or tailgate open, the rear bumper of the vehicle can be used as a seat. For example, it is common for an individual to sit on the rear bumper while changing his or her shoes or while watching a spectacle, since the rear bumper is at a convenient height.

One problem with using the rear bumper as a seat is that it can be uncomfortable, as the bumper is shaped for functional reasons, such as crash safety, and/or to ensure adequate closing of the tailgate, instead of for the seating of an individual. Another problem is that the rear end of the vehicle can often be dirty, which may deter an individual from sitting on the rear bumper so as to avoid spoiling their clothes. Additionally or alternatively, the individual may wish to prevent the rear bumper from being damaged when they sit on the rear bumper, for example where the individual's clothing may have a zips and/or buckles that could scratch the paint of the rear bumper.

U.S. Patent Application Publication No. 2007/0018475 A1 discloses a deployable pad that protects a vehicle rear bumper from accidental damage when cargo is loaded or off-loaded. The deployable pad folds flat onto the cargo area floor, a cargo area liner or the trunk floor when not in use. U.S. Pat. No. 3,902,752 discloses a bumper apron unit for automobile trunks to protect an individual's clothes when loading or unloading items. The apron is foldable in an accordion shape and fits in a carrier connected to the trunk wall, to prevent it from taking up space on the trunk floor and from becoming unfolded and getting dirty.

It would be desirable for an individual to be able to sit comfortably over the rear bumper of a vehicle without dirtying their clothes and/or damaging the bumper.

SUMMARY OF THE INVENTION

According to an aspect of the present disclosure, a vehicle loadspace floor is provided. The vehicle loadspace floor includes a first deployable portion, and a second deployable portion, the first and second deployable portions cooperating to form a rearward-facing seat extending through an opening of a loadspace of a vehicle when deployed from the loadspace floor.

According to another aspect of the present disclosure, a vehicle is provided. The vehicle includes a loadspace having an opening, and a loadspace floor. The loadspace floor includes a first deployable portion, and a second deployable portion, the first and second deployable portions cooperating to form a rearward-facing seat extending through the opening of the loadspace when deployed from the loadspace floor.

According to a further aspect of the present disclosure, a method of deploying a vehicle seat from a loadspace floor of a vehicle is provided. The method includes the steps of providing a loadspace floor comprising a first deployable portion and a second deployable portion, and deploying the first and second deployable portions from the loadspace floor, the first and second deployable portions cooperating to form a rearward-facing seat extending through an opening of a loadspace of the vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a side view of the rear portion of the vehicle with the second deployable portion in another deployed state;

FIG. 4 is a side view of the rear portion of the vehicle with the first deployable portion and the second deployable portion in a deployed state;

DETAILED DESCRIPTION OF THE PREFERRED EMBODIMENTS

The present disclosure provides a loadspace floor 101 of a vehicle, wherein the loadspace floor 101 can be reconfigured for use as a seat. In particular, the loadspace floor 101 comprises a first portion 103 and a second portion 105 that are deployable from the loadspace floor 101 to form a rear-facing seat 107 that extends through the opening of a loadspace, such as a trunk or cargo area, of the vehicle. In the context of the present disclosure, the term "loadspace floor" is understood to mean any component, system or assembly that may be installed to a vehicle for the purpose of covering at least a portion of the loadspace of the vehicle. For example, the loadspace floor 101 may comprise one or more panels and/or mats that are configured to extend at least partially across the loadspace of the vehicle and/or through the opening of a trunk of the vehicle. The loadspace floor 101 may comprise one or more guide members, frames and/or trays that may be installed to a vehicle for the purpose of covering at least a portion of the loadspace of the vehicle. In one arrangement, the loadspace floor 101 may comprise one or more panels that are movable relative to a body portion of the loadspace floor 101.

Figure 1:
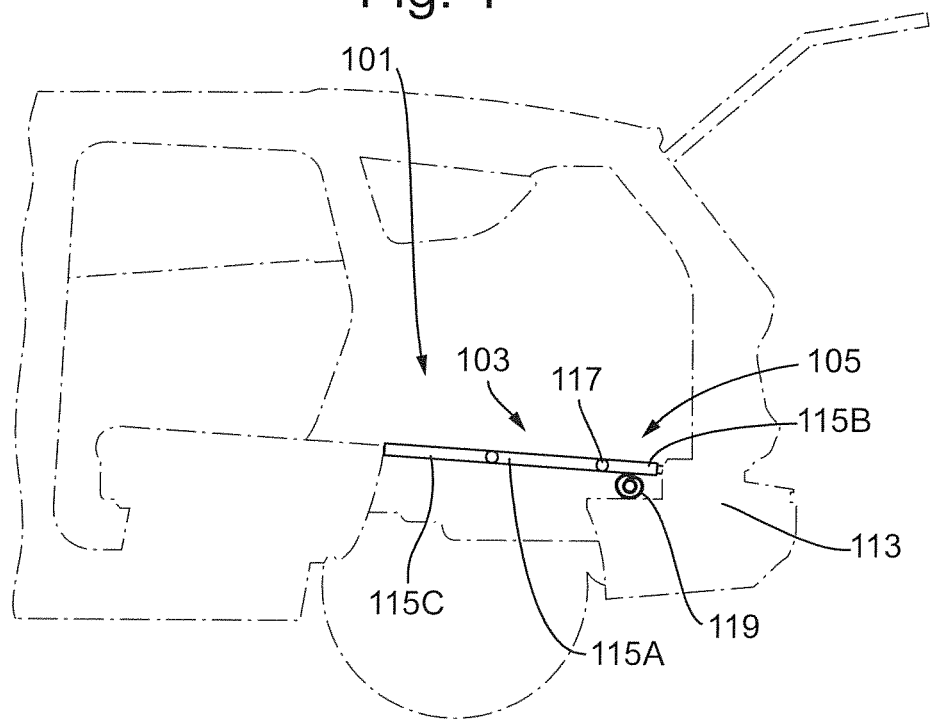
FIG. 1 is a side view of a rear portion of a vehicle having a vehicle loadspace floor having a first deployable portion and a second deployable portion in the trunk.

FIG. 1 depicts one arrangement of the loadspace floor 101 according to the present disclosure in which the first portion 103 is movable from a first position, for example, where it forms part of a deck of the loadspace floor 101, to a second position in which it forms a seat back 109 of the rear-facing seat 107. In a similar manner, the second portion 105 is movable from a first position, for example, where it forms part of a deck of the loadspace floor 101, to a second position in which it forms a seat base 111 of the rear-facing seat 107. When the first portion 103 and the second portion 105 are deployed from the loadspace floor 101 they cooperate to form a rear-facing seat 107. In other words, when both of the first portion 103 and the second portion 105 are in respective second positions, they form the rear-facing seat 107 extending through the opening of a trunk of the vehicle. The present disclosure therefore provides a vehicle loadspace floor 101 that can be reconfigured for use as a rear-facing seat 107, which allows an individual to sit comfortably over a rear bumper 113 of the vehicle, for example, for an extended period of time. This is advantageous as the rear bumper 113 of a vehicle typically is not specially adapted for use as a seat, which makes it difficult for an individual to use the rear bumper 113 as a place to rest, for example, when changing footwear and/or when viewing an outdoor event.

The first portion 103 may be moveably coupled to the loadspace floor 101. For example, the loadspace floor 101 may comprise a rotational and/or slidable first coupling that allows the first portion 103 to deploy from the loadspace floor 101. Similarly, the second portion 105 may be moveably coupled to the loadspace floor 101. For example, the loadspace floor 101 may comprise a rotational and/or slidable second coupling that allows the second portion 105 to deploy from the loadspace floor 101.

Each of the first portion 103 and the second portion 105 may be independently coupled to the loadspace floor 101, so that an operator can deploy either of the first portion 103 and the second portion 105, as desired. For example, the operator may wish to only deploy the second portion 105 to form the seat base 111 to allow one or more users to perch on the rear bumper 113, without deploying the seatback 109.

Alternatively, the loadspace floor 101 may comprise an operative connection between the first and second couplings. The operative connection may be configured such that deployment of one of the first portion 103 and the second portion 105 effects the deployment of the other of the first portion 103 and the second portion 105. For example, the first portion 103 may comprise a lifting feature, such as a handle or a strap, which the operator may pull to deploy the first portion 103. The operative connection may comprise a geared mechanism configured to effect the deployment of the second portion 105 as the operator deploys the first portion 103. In this manner, the operator may perform only one operation in order to deploy both of the first and second portions 103, 105 to form the rearward-facing seat 107. It is understood that either, or both of, the first portion 103 and the second portion 105 may be provided with a lifting feature that permits the operator to deploy the rearward-facing seat 107 using a single motion.

FIGS. 1-6 depict one arrangement of the loadspace floor 101 according to the present disclosure. In FIG. 1, the first and second deployable portions 103, 105 are shown in a stowed position in the loadspace floor 101, such that the loadspace floor 101 comprises a platform that substantially spans the loadspace of the vehicle. The first and second deployable portions 103, 105 may each comprise one or more panels that are movable to an inclined position, i.e., a position where the panel is not in line and is angled with the remaining portion of the loadspace floor 101. In order to allow the loadspace floor 101 to be reconfigured, each panel may be rotationally coupled to the loadspace floor 101, for example, by virtue of a hinged coupling 117, so that the panels pivot about a common axis. Each of the panels may, however, be coupled to the loadspace floor 101 in any appropriate manner, for example, in a rotational and/or a slidable manner. In the arrangements shown in FIGS. 1-6, the loadspace floor 101 comprises a first panel 115A, a second panel 115B and a third panel 115C. The first and third panel 115A, 115C form at least part of the first deployable portion 103, and the second panel 115B forms at least part of the second deployable portion 105. It is understood, however, that the first and second deployable portions 103, 105 may comprise any appropriate number and/or type of components that allow the loadspace floor 101 to be reconfigured to form the rear-facing seat 107, and each of the first and second deployable portions 103, 105 are not limited to comprising the components shown in the appended figures. Indeed, the loadspace floor 101 may comprise one or more further deployable portions, each comprising any appropriate number and/or type of components that allow the loadspace floor 101 to be reconfigured to form the rear-facing seat 107.

Figure 2:
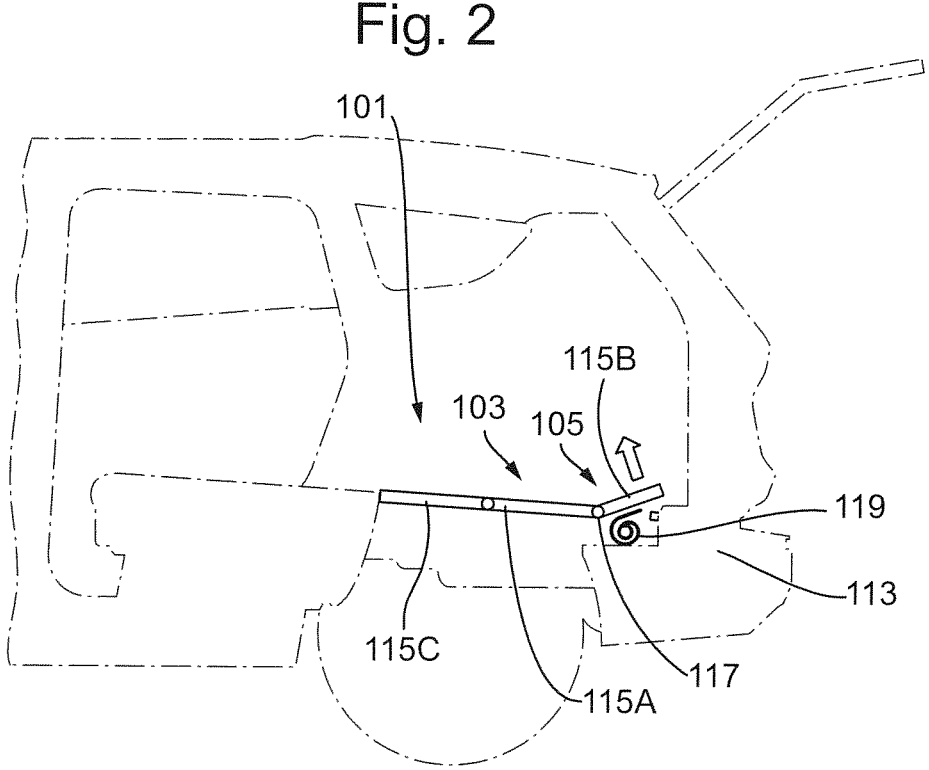
FIG. 2 is a side view of the rear portion of the vehicle with the second deployable portion in a deployed state.

In FIG. 2, the second deployable portion 105 has been moved from the stowed position to the deployed position, so that the second panel 115B of the second portion 105 is inclined to the remaining portion of the loadspace floor 101. Movement of the second panel 115B of the second portion 105 results in the second portion 105 forming at least part of the seat base 111 of the rear-facing seat 107. For example, the second panel 115B of the second portion 105 may be configured to adjoin a portion of the rear bumper 113, so that the second panel 115B of the second portion 105 forms the seat base 111 in combination with a portion of the rear bumper 113. Although it is not shown in FIGS. 2-4, it is understood that in another arrangement the second panel 115B of the second portion 105 may extend through the opening of the trunk of the vehicle when in the deployed position. In a similar manner, the first panel 115A of the first portion 103 may extend through the opening of the trunk of the vehicle when in the deployed position.

Figure 6:
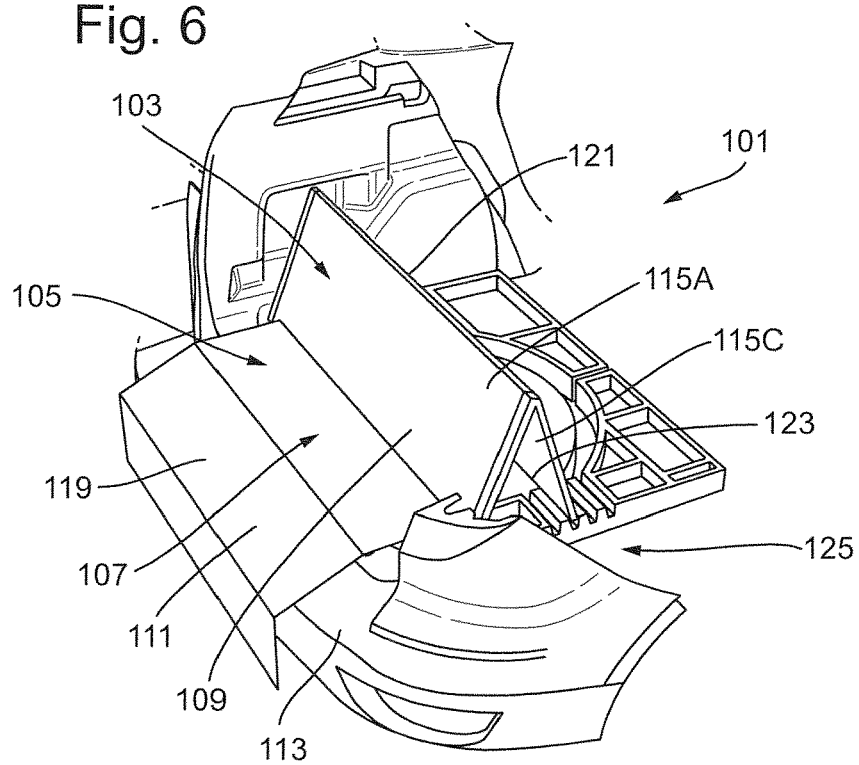
FIG. 6 is a rear perspective view of the rear portion of the vehicle with the vehicle loadspace floor in a deployed state.

In one arrangement, the first portion 103 may comprise a locking feature configured to lock the first portion 103 in the deployed position. For example, the first portion 103 may comprise a locking feature configured to engage a portion of the body of the vehicle, so as secure the first portion 103 in the deployed position. In this manner, the first portion 103 is securable in the deployed state so as to limit movement of the first portion 103 under the weight of an occupant of the rear-facing seat 107. In FIGS. 4 and 6, the locking feature comprises the third panel 115C, which is configured to support the first panel 115A when the first panel 115A is deployed from the loadspace floor 101. The first and third panels 115A, 115C may be movably coupled to each other, so that as an individual deploys the first portion 103 from the loadspace floor 101, the first and third panels 115A, 115C articulate relative to each other to be brought into respective positions that allows the third panel 115C to support the first panel 115A.

Additionally or alternatively, the second portion 105 may comprise a locking feature configured to engage a portion of the body of the vehicle, such as the rear bumper 113, so as to lock the second portion 105 in the deployed position. In this manner, the second portion 105 is securable in the deployed state so as to restrain movement of the second portion under the weight of an occupant of the rear-facing seat 107.

In the arrangement shown in FIGS. 1-6, the second deployable portion 105 comprises a bumper protector 119 that is deployable from the loadspace floor 101. The bumper protector 119 may be provided in combination with the second panel 115B of the second portion 105 so that the second panel 115B and the bumper protector 119 form the seat base 111 when the second portion 105 is in the deployed state. It is appreciated, however, that the second deployable portion 105 may comprise only the bumper protector 119, and that the second panel 115B may be provided as an additional component of the loadspace floor 101.

In the appended figures, the bumper protector 119 is secured to the underside of the panel 115B so that the bumper protector 119 may be deployed upon lifting the second panel 115B up from the loadspace floor 101. In particular, FIG. 3 depicts the bumper protector 119 being deployed from the underside of the second panel 115B to a position where the bumper protector 119 shields an occupant's legs from the rear bumper 113 (and/or the rear bumper 113 from the occupant's legs) when seated in the rear-facing seat 107. In this manner, the occupant may use the rear-facing seat 107 without concern of soiling their clothes on the rear bumper 113 or damaging the rear bumper 113.

In the illustrated embodiment, the second portion 105 of the rear-facing seat 107 may comprise the second panel 115B and the bumper protector 119 which cooperate to form the seat base 111 of the rear-facing seat 107. However, in one or more other arrangements, which are not shown, the bumper protector 119 may be provided at any other appropriate location on the vehicle. For example, the bumper protector 119 need not necessarily be physically coupled to the second panel 115B, and may be stowed at a position remote from the second panel 115B. Further, it is understood that the second portion 105 may comprise the bumper protector 119 without the second panel 115B. For example, the first deployable portion 103 may comprise the first panel 115A and the second portion may comprise the bumper protector 119, so that when the first panel 115A and the bumper protector 119 are deployed from the loadspace floor 101 they cooperate to form the rear-facing seat 107. In FIGS. 4 and 6, the first deployable portion 103 has been moved from the stowed position to the deployed position, so that the panel first 115A of the first portion 103 is inclined to the remaining portion of the loadspace floor 101. In the arrangement shown in FIG. 4, the second panel 115A of the first portion 103 and the second panel 115B of the second portion 105 are positioned at approximately 110 degrees to each other. However, the first panel 115A of the first portion 103 and the second panel 115B of the second portion 105 may be positioned at any appropriate angle relative to each other.

Movement of the first panel 115A of the first portion 103 results in the first portion 103 forming at least part of the seat back 109 of the rear-facing seat 107. For example, the second panel 115B of the second portion 105 may be moveable to adjoin the first panel 115A of the first portion 103, so that the first and second panels 115A, 115B cooperate to form the rear-facing seat 107, as shown in FIG. 4. In another arrangement, the first and second portions 103, 105 may be separated, when in a deployed position. For example, where the first and second panels 115A, 115B are independently coupled to the loadspace floor 101, the first and second panels 115A, 115B may be deployed so that there is a gap between the first and second panels 115A, 115B when they form the rear-facing seat 107. In another arrangement (not shown), the second panel 115B and the bumper protector 119 may be operatively connected so that deployment of the second panel 115B from the loadspace floor 101 causes the bumper protector 119 to be deployed as well. In this manner, the second panel 115B may form a cover over the bumper protector 119 when the bumper protector 119 is in a stowed position. Additionally or alternatively, the second panel 115B may be used as a handle to deploy the bumper protector 119 from the loadspace floor 101.

In one arrangement, the second panel 115B may be operatively coupled to the loadspace floor 101 without forming part of the second deployable portion 105. For example, the second panel 115B may simply form a cover over the second deployable portion 105, such that the cover may be temporarily moved, e.g., removed, to allow access to the second deployable portion 105.

Figure 5:
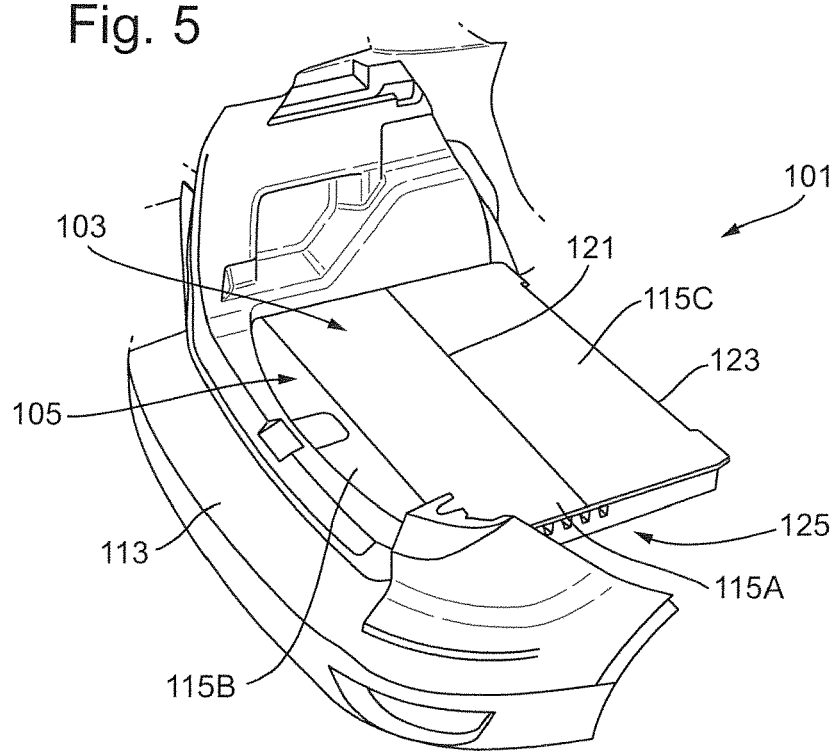
FIG. 5 is a rear perspective view of the rear portion of the vehicle with the vehicle loadspace floor in a stowed state.

FIGS. 5 and 6 show perspective views of an arrangement of the loadspace floor 101 in a stowed configuration and a deployed configuration, respectively. In the arrangement shown in FIG. 5, the first deployable portion 103 comprises the first panel 115B and the third panel 115C, and the second deployable portion 105 comprises the second panel 115B and the bumper protector 119. When the loadspace floor 101 is in the stowed configuration, the first, second and third panels 115A, 115B, 115C cooperate to form a platform of the loadspace floor 101 onto which cargo may be loaded. While it cannot be seen from FIG. 5, the bumper protector 119 is stowed under the second panel 115B, for example, in a manner similar to that shown in FIGS. 1-4.

In FIG. 6, the first deployable portion 103 and the second deployable portion 105 have been deployed from the loadspace floor 101 to form the rear-facing seat 107, in which the first and third panels 115A, 115C cooperate to form the seat back 109, and the bumper protector 119 forms at least a portion of the seat base 111. In the arrangements shown, the third panel 115C is hingedly coupled to the first panel 115A along what forms a top edge 121 of the seat back 109, when the first portion 103 is in the deployed state. It should be appreciated, however, that the third panel 115C may be coupled to the first panel 115A in any appropriate manner, or indeed provided as a separate component. The third panel 115C, for example, a lower edge 123 of the third panel 115C, may be configured to engage a locking feature 125, for example, a slot, of the loadspace floor 101. Thus, by virtue of the third panel 115C being coupled to the first panel 115A, and the engagement of the third panel 115C with the locking feature 125, the first deployable portion 105 is supported in a position in which it provides the seatback 109 of the rear-facing seat 107. Advantageously, the locking feature 125 may be provided with a plurality of slots that allow the third panel 115C to support the first panel 115A in different positions.

According to one aspect of the present disclosure there is provided a vehicle loadspace floor comprising a first deployable portion and a second deployable portion, the first and second deployable portions cooperating to form a rearward-facing seat extending through the opening of a trunk of the vehicle when deployed from the loadspace floor.

The first deployable portion may deploy to form at least a portion of a seat back of the seat. For example, the first portion may be moveable from a first position in which it forms a usable surface of the loadspace floor to a second position in which it forms a support against which an occupant may lean when using the rearward-facing seat. The support may comprise at least a lower back support. For example, the loadspace floor may be reconfigured to form a lower back support for an occupant, which increases the level of comfort of the rearward-facing seat when an occupant uses the seat, especially over extended periods.

The second deployable portion may deploy to form at least a portion of a seat base of the seat. For example, the second portion may be moveable from a first position in which it forms a usable surface of the loadspace floor to a second position in which it forms a support on which an occupant may sit when using the rearward-facing seat.

The second deployable portion may deploy to form a bumper protector. For example, the bumper protector may be configured to shield an individual's legs from a rear bumper of the vehicle when seated in the rearward-facing seat. Additionally or alternatively, the bumper protector may be configured to protect the paintwork/finish on the exterior surface of the rear bumper. For example, the bumper protector may be positioned to protect the rear bumper against damage from an occupant's shoes when the second portion is in the second position. The bumper protector may be stowable underneath the loadspace floor. The bumper protector may be biased towards a stowed position underneath the loadspace floor. The bumper protector may comprise at least one flexible portion and/or at least one rigid portion.

The present disclosure is advantageous, therefore, as an individual is able to reconfigure the loadspace floor of the vehicle to form a rear-facing seat that extends through the opening to the trunk of the vehicle. In other words, when the seat is in a deployed state, at least one of the first deployable portion and the second deployable portion extends from within the vehicle to a position outside the vehicle. The rear-facing seat may extend at least partially over a rear bumper of the vehicle. The rear-facing seat may be restricted from moving to a fully deployed state when the opening to the trunk is covered, for example when a trunk door is closed. In one arrangement, the opening of the tailgate may affect the deployment of the rear-facing seat, for example, by virtue of a mechanical connection and/or an electronic control system.

The first deployable portion may comprise a first panel of the loadspace floor. The first panel may be movably, for example slidably and/or rotationally, coupled to the loadspace floor. The first panel may be aligned with the remainder of the loadspace floor when in a first position, i.e., a stowed position. The first panel may be inclined and/or spaced apart from the remainder of the loadspace floor when in a second position, i.e., a deployed position. An upwardly facing surface of the first panel may define a portion of a usable surface of the loadspace floor when the first panel is in the first position. The upwardly facing surface of the first panel may define a support surface of the seat back when the first panel is in the second position. In other words, the rearward-facing seat may be configured such that the upwardly facing surface of the first panel is the surface of the seat back against which the occupant leans when seated. The upwardly facing surface of the first panel may be shaped to engage an occupant's back.

The second deployable portion may comprise a second panel of the loadspace floor. The second panel may be movably, for example slidably and/or rotationally, coupled to the loadspace floor. The second panel may be aligned with the remainder of the loadspace floor when in a first position, i.e., a stowed position. The second panel may be inclined and/or spaced apart from the remainder of the loadspace floor when in a second position, i.e., a deployed position. An upwardly facing surface of the second panel may define a portion of a usable surface of the loadspace floor when the second panel is in the first position. The upwardly facing surface of the second panel may define a support surface of the seat base when the second panel is in the second position. In other words, the rearward-facing seat may be configured such that the upwardly facing surface of the second panel is the surface of the seat base on which the occupant sits when seated. The upwardly facing surface of the second panel may be shaped to engage an occupant's seat and/or legs.

The vehicle loadspace floor may comprise a third deployable portion configured to support the first deployable portion in a deployed state. The third deployable portion may be movably coupled to the first deployable portion. The third deployable portion may be configured to engage a locking feature of the loadspace floor, for example, a slot. The engagement between the third deployable portion and the locking feature may set the distance by which the first deployable portion is deployed from the loadspace floor.

The bumper protector may be stowable underneath the loadspace floor. For example, the bumper protector may be stowable underneath the second panel of the loadspace floor. In this manner, when the second panel is moved from the first position to the second position, the bumper protector may be deployed from underneath the loadspace floor. The bumper protector may be biased towards a stowed position underneath the loadspace floor.

The vehicle loadspace floor may comprise an operative connection, such as a slidable, rotational and/or geared mechanism, between the first deployable portion and the second deployable portion. The operative connection may be configured to effect the deployment of one of the first deployable portion and the second deployable portion upon the deployment of the other of the first deployable portion and the second deployable portion. In this manner, an individual may cause both of the first deployable portion and the second deployable portion to be moved to a deployed position, for example, a fully deployed position, by moving one of the first deployable portion and the second deployable portion.

According to another aspect of the present disclosure, a vehicle may be provided comprising a trunk having an opening and one or more of the above mentioned vehicle loadspace floors.

According to another aspect of the present disclosure, there is provided a method of deploying a vehicle seat from a loadspace floor of a vehicle, the loadspace floor comprising a first deployable portion and a second deployable portion. The method comprises deploying the first and second deployable portions from the loadspace floor, the first and second deployable portions cooperating to form a rearward-facing seat extending through the opening of a trunk of the vehicle.

According to a further aspect of the present disclosure there is provided a vehicle loadspace floor comprising a first deployable portion and a second deployable portion, the first deployable portion being movable to a position where it forms a seat back of a seat, and the second deployable portion being movable to a position where it forms a support to limit movement of the first deployable portion when in a deployed state.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle loadspace floor comprising:
   a first deployable portion; and
   a second deployable portion, the first and second deployable portions cooperating to form a rearward-facing seat extending through an opening of a loadspace of a vehicle when deployed from the loadspace floor, wherein the second deployable portion deploys to form a bumper protector that extends downward, wherein the first deployable portion deploys to form a seat back of the seat.

2. The vehicle loadspace floor according to claim 1, wherein the second deployable portion deploys to form a seat base of the seat.

3. The vehicle loadspace floor according to claim 1, wherein the bumper protector is configured to shield an individual's legs from a rear bumper of the vehicle when seated in the seat.

4. The vehicle loadspace floor according to claim 1, wherein the first deployable portion comprises a first panel of the loadspace floor.

5. The vehicle loadspace floor according to claim 4, wherein the first panel is movably coupled to the loadspace floor.

6. The vehicle loadspace floor according to claim 1, wherein the second deployable portion comprises a second panel of the loadspace floor.

7. The vehicle loadspace floor according to claim 6, wherein the second panel is movably coupled to the loadspace floor.

8. The vehicle loadspace floor according to claim 6, wherein the second panel is inclined to the loadspace floor in a deployed configuration.

9. The vehicle loadspace floor according to claim 1, wherein the vehicle loadspace floor comprises an operative connection between the first deployable portion and the second deployable portion, the operative connection being configured to effect the deployment of one of the first deployable portion and the second deployable portion upon the deployment of the other of the first deployable portion and the second deployable portion.

10. The vehicle loadspace floor system according to claim 1 further comprising a third deployable portion configured to support the first deployable portion in a deployed state.

11. The vehicle loadspace floor system according to claim 10, wherein the third deployable portion is movably coupled to the first deployable portion.

12. The vehicle loadspace floor system according to claim 10, wherein the third deployable portion is configured to engage a locking feature of the loadspace floor, the engagement between the third deployable portion and the locking feature setting a distance by which the first deployable portion is deployed from the loadspace floor.

13. A vehicle comprising:
a loadspace having an opening; and
a loadspace floor comprising:
a first deployable portion;
a second deployable portion, the first and second deployable portions cooperating to form a rearward-facing seat extending through the opening of the loadspace when deployed from the loadspace floor;
a third deployable portion configured to support the first deployable portion in a deployed state; and
a locking feature comprising a plurality of slots that allow the third deployable portion to support the first deployable portion in different positions.

14. The vehicle according to claim 13, wherein the first deployable portion deploys to form a seat back of the seat.

15. The vehicle according to claim 13, wherein the second deployable portion deploys to form a seat base of the seat.

16. The vehicle according to claim 13 further comprising a rear bumper, wherein the second deployable portion deploys to form a bumper protector that extends downward.

17. The vehicle according to claim 16, wherein bumper protector is configured to shield an individual's legs from the rear bumper of the vehicle when seated in the seat.

18. A vehicle loadspace floor comprising:
a first deployable portion;
a second deployable portion, the first and second deployable portions cooperating to form a rearward-facing seat extending through an opening of a loadspace of a vehicle when deployed from the loadspace floor, wherein the second deployable portion deploys to form a bumper protector that extends downward, and
a third deployable portion configured to support the first deployable portion in a deployed state, wherein the third deployable portion is configured to engage a locking feature of the loadspace floor, the engagement between the third deployable portion and the locking feature setting a distance by which the first deployable portion is deployed from the loadspace floor, and wherein the locking feature comprises a plurality of slots that allow the third deployable portion to support the first deployable portion in different positions.

* * * * *